United States Patent [19]

Gardner

[11] 4,008,539
[45] Feb. 22, 1977

[54] NOISE MAKING SLIP SINKER

[76] Inventor: Jeffrey O. Gardner, R.R. 5, Box 492, Newburgh, Ind. 47630

[22] Filed: Nov. 5, 1975

[21] Appl. No.: 628,892

[52] U.S. Cl. .............................. 43/42.31; 43/44.9
[51] Int. Cl.² ................... A01K 85/00; A01K 95/00
[58] Field of Search .......................... 43/42.31, 44.9

[56] References Cited
UNITED STATES PATENTS

| 3,908,298 | 9/1975 | Strader | 43/42.31 X |
| 3,947,990 | 4/1976 | Johnson | 43/44.9 |

Primary Examiner—Hugh R. Chamblee
Assistant Examiner—Daniel J. Leach
Attorney, Agent, or Firm—Woodard, Weikart, Emhardt & Naughton

[57] ABSTRACT

A noise making slip sinker comprising a shell having a distal end which is open and a proximal end with an aperture therein. A guide plug is sealingly received within the distal end of the shell and has an elongated guide portion extending to and sealingly received by the proximal end of the shell. The guide plug has a passageway which extends the length of the guide plug from the aperture in the proximal end of the shell to a point located outside of the distal end of the shell, and at least one rigid ball is contained within the space between the guide portion of the guide plug and the interior wall of the shell.

8 Claims, 2 Drawing Figures

NOISE MAKING SLIP SINKER

BACKGROUND OF THE INVENTION

1. Field of the Invention

This invention relates to the field of fishing sinkers.

2. Description of the Prior Art

The primary purpose of fishing sinkers is to add weight near the end of the fishing line to facilitate casting and to assure that the attached fishing lure or bait is properly positioned below the water. Sinkers are usually made from lead so that sufficient weight is obtained to perform these functions without requiring a large volume of material. Sinkers are typically small, generally irregularly shaped objects which function only as a source of weight for the fishing line.

In contrast, fishing lures are generally designed to attract the fish and to stimulate their hunting instincts. Artificial fishing lures are designed to simulate the color and the movement of a particular type of fish food, and the fish is attracted upon viewing the lure. It is also known that fish are able to detect vibrations in the water. Lures have therefore been designed which produce sound vibrations when drawn through the water. These noise making fishing lures typically include at least one metal ball held within an airtight cavity in the lure.

The problem with the noise making lures is that the noise making feature generally must be incorporated within the lure as it is manufactured. Alternatively, a silent lure may be modified to add the noise making feature. The noise making feature, however, is not easily incorporated within many types of lures because the movement of the metal balls within the chamber interferes with the intended movement of the lure itself through the water. This is particularly true if a silent lure is modified to make noise, since the lure was specifically designed to operate without the modification.

SUMMARY OF THE INVENTION

A noise making slip sinker is disclosed herein which comprises a non-buoyant container having a hole extending therethrough and a watertight chamber therein, and at least one rigid object loosely contained within the chamber in the container.

It is an object of the present invention to provide a slip sinker which produces vibrations for attracting fish.

It is a further object of the present invention to provide a means for attaching a noise making device to a fishing line without modifying the fishing lure, and without interfering with the intended movement of the fishing lure.

Another object of the present invention is to provide a noise making device which also performs the function of a fishing slip sinker.

These and other objects of the present invention will become apparent from the following description.

DESCRIPTION OF THE PREFERRED EMBODIMENT

Figure 1:
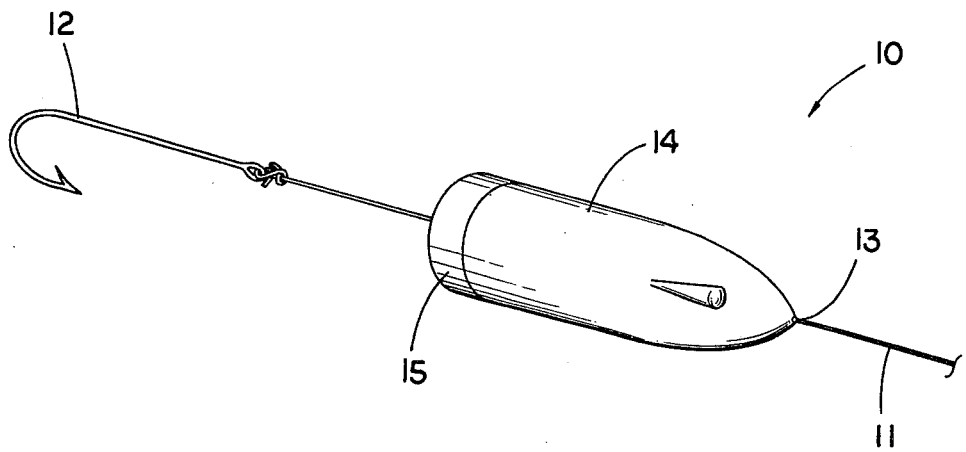
FIG. 1 is a perspective view of the noise making slip sinker attached to a fishing line above a fish hook.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1, there is shown a noise making slip sinker 10 attached to fishing line 11 near fish hook 12. Fishing line 11 extends through the aperture 13 in the proximal end of shell 14 and through a passageway in guide plug 15.

The slip sinker shown in FIG. 1 is an elongated, generally streamlined structure. This shape permits the slip sinker to be attached to a fishing line near a lure with a minimum of effect upon the action of the lure. The noise making feature is thereby obtained without requiring modification of a normally silent fishing lure. It has been found that sufficient noise making action may be obtained even with the streamlined and balanced configuration for the noise making slip sinker. This noise making action is obtained by the normal action of the attached fishing lure and also by the motion resulting from drawing the slip sinker through the water.

Figure 2:
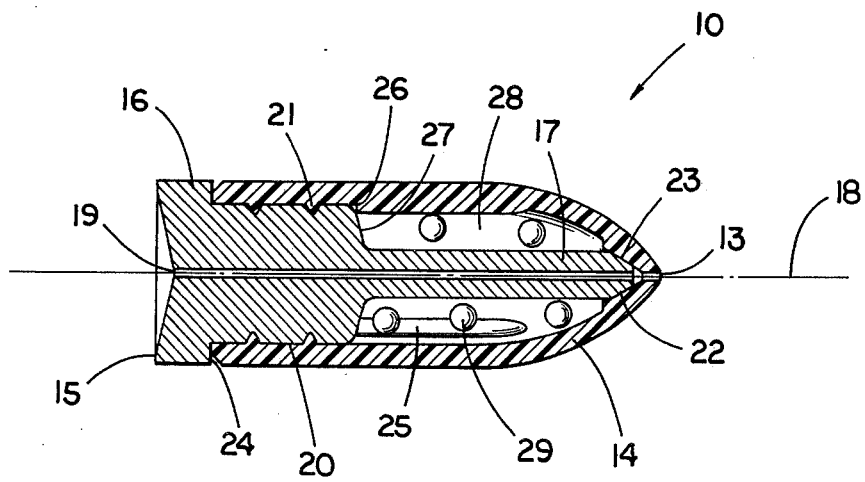
FIG. 2 is a cross-sectional view of the noise making slip sinker.

As depicted in FIG. 2, the noise making slip sinker 10 includes a shell 14 and a guide plug 15. Shell 14 is generally paraboloidal in shape, having an aperture 13 at the proximal end or the apex and being open at the distal end. Guide plug 15 includes a plug portion 16 and a tubular guide portion 17. The guide plug 15 and shell 14 are symmetrical about a central axis, shown by line 18. By being symmetrical, the center of gravity for any cross section in a plane normal to the central axis 18 lies approximately on the central axis.

The guide plug 15 has a passageway 19 which extends the length of the guide plug and lies generally along the central axis 18. Aperture 13 in shell 14 is aligned with the passageway 19, and the fishing line is threaded through the length of the slip sinker. This balanced construction further ensures that the noise making slip sinker 10 will have a minimum effect upon a lure attached to a fishing line threaded through the slip sinker.

The noise making slip sinker preferably comprises a guide plug of molded lead and a shell made from a plastic material. The lead guide plug provides a sufficient amount of weight for the slip sinker with a reasonably small volume of material. The plastic shell is preferable because it is inexpensive to make and has adequate noise making characteristics.

The plug portion 16 of the guide plug 15 includes a cylindrical surface 20 which is sealingly received by the interior wall of shell 14. Circumferential grooves such as 21 are located in the cylindrical surface 20 of the plug portion 15. The grooves are utilized in bonding the plastic shell to the lead guide plug. Prior to assembly, the plug portion 16 of the guide plug 15 is immersed in a plastic solvent. The guide plug 15 is then inserted into the shell 14. The plastic solvent retained on the cylindrical surface 20 and within the circumferential grooves such as 21 causes a portion of the interior wall of the shell 14 to soften and deform. A portion of the softened interior wall is then received within the grooves in the cylindrical surface. When the solvent then evaporates and the interior wall again becomes rigid, the part of the wall which has deformed into the grooves provides a firm seal between the plug portion of the guide plug and the shell. Alternatively, the grooves may be used to provide a recess in which an adhesive material may be retained when the slip sinker is assembled. The adhesive within the grooves will bond the cylindrical surface of the plug portion 16 to the interior wall of the shell 14.

The end 22 of the tubular guide portion 17 has a frustoconical shape. A complementary frustoconical portion 23 is formed in the interior of the shell 14 near aperture 13. The end 22 of the guide portion 17 is sealingly received by the frustoconical portion 23.

A first shoulder portion 24 of the plug portion 16 engages the distal end surface of the shell 14. Located on the interior wall of the shell 14 are three elongated ribs, such as 25, which are generally parallel to the central axis 18. The elongated ribs include a shoulder engaging surface such as 26 which lies in a plane normal to the central axis 18. Surface 26 is engaged by a second shoulder portion 27 of the plug portion 16.

The shell 14 and the guide plug 15 form a chamber 28 defined by the guide portion 17 and the plug portion 16, and the interior wall of the shell 14. Contained loosely within chamber 28 are several small noise-making objects such as 29. These objects may be formed from any material but they should be of a sufficient weight and rigidity to produce vibrations when they strike the shell 14. These objects are preferably formed from small, generally spherical metal balls. The impact of these metal balls against a plastic shell provides adequate vibrations for attracting fish. The spherical shape greatly reduces the likelihood that the objects will become lodged within the chamber.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A slip sinker which comprises:
    a shell having a distal end defining an opening and having a proximal end defining an aperture;
    a guide plug having a plug portion which is sealingly received near the distal end of the shell and having a guide portion extending inside the shell from the plug portion to the proximal end of the shell, the guide portion having a proximal end which is sealingly received near the proximal end of the shell, the guide plug having a passageway extending therethrough from the plug portion to the proximal end of the guide portion, each end of the passageway being accessible from outside the shell, a chamber being defined by the interior wall of the shell, the guide portion and the plug portion;
    at least one noise-making object loosely held within the chamber; and
    the plug portion having a first surface sealingly received near the distal end of the shell, the first surface including a recess whereby a softened portion of the interior wall of the shell may be received for causing the guide plug to be firmly sealed with the shell.

2. The slip sinker of claim 1 in which the noise making object comprises a generally spherical metal ball.

3. The slip sinker of claim 1 in which the plug portion and the guide portion comprise a single molded lead unit having a first surface sealingly received near the distal end of the shell and a second surface sealingly received near the proximal end of the shell.

4. The slip sinker of claim 3 in which the guide plug includes a first shoulder surface abutting the distal end of the shell.

5. The slip sinker of claim 4 in which the shell is paraboloidal in shape, the aperture being located at the apex thereof.

6. The slip sinker of claim 5 in which the proximal end of the guide portion is frustoconical and the interior of the proximal end of the shell includes a complementary frustoconical surface sealingly receiving the proximal end of the guide portion.

7. A slip sinker which comprises:
    a shell having a distal end defining an opening and having a proximal end defining an aperture, said shell being paraboloidal in shape and the aperture being located at the apex thereof;
    a guide plug having a plug portion which is sealingly received near the distal end of the shell and having a guide portion extending inside the shell from the plug portion to the proximal end of the shell, the guide plug having a passageway extending therethrough from the plug portion to the proximal end of the guide portion, each end of the passageway being accessible from outside the shell, a chamber being defined by the interior wall of the shell, the guide portion and the plug portion;
    at least one noise-making object loosely held within the chamber;
    the guide plug including a first shoulder surface abutting the distal end of the shell, the guide portion having a proximal end which is sealingly received near the proximal end of the shell;
    the plug portion including a second shoulder surface facing generally toward the proximal end of the shell and the interior wall of the shell including a rib having a surface lying immediately adjacent the second shoulder surface of the plug portion;
    the proximal end of the guide portion being frustoconical and the interior of the proximal end of the shell including a complementary frustoconical surface sealingly receiving the proximal end of the guide portion;
    the plug portion and the guide portion comprising a single molded lead unit having a first surface which is sealingly received near the distal end of the shell and a second surface sealing received near the proximal end of the shell, the first surface including recesses whereby a softened portion of the interior of the wall of the shell may be received for causing the guide plug to be firmly seated with the shell.

8. The slip sinker of claim 7 which comprises a plurality of noise-making objects loosely held within the chamber, the noise-making objects comprising generally spherical metal balls.

* * * * *